(12) United States Patent
Kimura et al.

(10) Patent No.: US 11,671,560 B2
(45) Date of Patent: Jun. 6, 2023

(54) IN-VEHICLE CAMERA AND VEHICLE CONTROL SYSTEM

(71) Applicant: DENSO CORPORATION, Kariya (JP)

(72) Inventors: Masao Kimura, Kariya (JP); Nobuhisa Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/326,730

(22) Filed: May 21, 2021

(65) Prior Publication Data
US 2021/0368132 A1    Nov. 25, 2021

(30) Foreign Application Priority Data
May 25, 2020    (JP) ............................. JP2020-090307

(51) Int. Cl.
| | |
|---|---|
| *H04N 7/10* | (2006.01) |
| *G03B 17/02* | (2021.01) |
| *B60R 11/04* | (2006.01) |
| *G06T 7/00* | (2017.01) |
| *H04N 23/51* | (2023.01) |
| *H04N 23/54* | (2023.01) |
| *B60R 11/00* | (2006.01) |

(52) U.S. Cl.
CPC ............. *H04N 7/102* (2013.01); *B60R 11/04* (2013.01); *G03B 17/02* (2013.01); *G06T 7/00* (2013.01); *H04N 23/51* (2023.01); *H04N 23/54* (2023.01); *B60R 2011/0003* (2013.01); *G06T 2207/30248* (2013.01)

(58) Field of Classification Search
CPC .... H04N 7/102; H04N 5/2252; H04N 5/2253; B60R 11/04; B60R 2011/0003; G03B 17/02; G06T 7/00; G06T 2207/30248
USPC ........................................................ 348/148
See application file for complete search history.

(56) References Cited

U.S. PATENT DOCUMENTS

2012/0247868 A1   10/2012   Kato et al.
2012/0265190 A1 *  10/2012   Curley ............... A61B 18/1477
                                                    29/600

(Continued)

FOREIGN PATENT DOCUMENTS

DE    10 2018 204 206 A1    10/2018
JP         2001-358493 A    12/2001
(Continued)

*Primary Examiner* — Rebecca A Volentine
*Assistant Examiner* — Matthew David Kim
(74) *Attorney, Agent, or Firm* — Maschoff Brennan

(57) ABSTRACT

An in-vehicle camera is provided which includes an imager equipped with a lens, a control board on which a circuit is mounted to control an operation of the imager, a flexible cable connecting the imager and the control board to be communicable therebetween, and an electrically conductive housing in which the imager, the flexible cable, and the control board are arranged. A spacer which is designed to have neither electromagnetic wave absorption nor electromagnetic wave reflection properties is arranged away from the control board in a contactless manner and located between the flexible cable and an inner surface of the housing to form a gap therebetween. This minimizes generation of noise transmitted from the housing to inside the vehicle without sacrificing the quality of electrical signals transmitted through a circuit in the flexible cable.

6 Claims, 4 Drawing Sheets

(56) References Cited

U.S. PATENT DOCUMENTS

| | | | |
|---|---|---|---|
| 2014/0140018 A1* | 5/2014 | Malek | H04M 1/0277 |
| | | | 361/752 |
| 2014/0160284 A1 | 6/2014 | Achenbach et al. | |
| 2018/0316833 A1 | 11/2018 | Okuda | |
| 2019/0369635 A1 | 12/2019 | Kobayashi et al. | |
| 2019/0389383 A1 | 12/2019 | Yajima et al. | |
| 2021/0127532 A1* | 4/2021 | Persson | H04N 5/2252 |

FOREIGN PATENT DOCUMENTS

| JP | 2006-135659 A | 5/2006 |
|---|---|---|
| JP | 2009-188314 A | 8/2009 |
| JP | 2009-266846 A | 11/2009 |

\* cited by examiner

IN-VEHICLE CAMERA AND VEHICLE CONTROL SYSTEM

CROSS REFERENCE TO RELATED DOCUMENT

The present application claims the benefit of priority of Japanese Patent Application No. 2020-090307 filed on May 25, 2020, the disclosure of which is incorporated herein by reference.

BACKGROUND

1 Technical Field

This disclosure relates generally to an in-vehicle camera mounted in a vehicle.

2 Background Art

Japanese Patent First Publication No. 2001-358493 teaches an in-vehicle camera which includes a housing, an image capturing device, a flexible cable, and a control board. The image capturing device is equipped with a lens. The control board has mounted thereon a circuit working to control an operation of the image capturing device. The flexible cable connects the image capturing device and the control board together to be communicable therebetween. The housing is made from metal and has the image capturing device, the flexible cable, and the control board disposed therein.

In the above in-vehicle camera, the flexible cable may be deflected by itself and then brought close to or into physical contact with the housing. A circuit installed in the flexible cable is usually covered with an outer insulating layer, thereby eliminating a risk of short-circuit to the housing. There is, however, a risk that adverse effects of an electrical current flowing through the circuit in the flexible cable may be exerted on the housing by an electrical field (i.e., parasitic capacitance) or magnetic field through a decreased gap or a contact between the flexible cable and the housing. This causes electrical current to flow in the housing, so that the housing may function as an antenna to emit noise (i.e., electromagnetic waves) into the vehicle, thereby adversely impinging operations of other devices mounted in the vehicle.

Some of electrical devices are, like in the above publication, equipped with an electromagnetic wave absorber covering an entire inner surface of the housing. Use of such a structure with the above described in-vehicle camera will face the following disadvantages.

Specifically, when the electromagnetic wave absorber is disposed close to the flexible cable, it facilitates exertion of adverse effects of current flowing in the circuit installed in the flexible cable on the electromagnetic wave absorber through an electrical field or magnetic field. This causes electrical energy of the current flowing through the circuit in the flexible cable to be consumed in a flow of electrical current through the electromagnetic wave absorber. Usually, the electromagnetic wave absorber is designed in terms of its function to absorb electromagnetic wave with high efficiency, and thus will consume the electrical energy of current flowing therethrough. The electrical energy of electrical signals flowing in the circuit of the flexible cable is, therefore, transmitted to the electromagnetic wave absorber through an electrical field or magnetic field and then consumed by the electromagnetic wave absorber, thereby resulting in deterioration of the electrical signals.

SUMMARY

It is an object of this disclosure to provide an in-vehicle camera which is designed to minimize generation of noise emitted from a housing into a vehicle without sacrificing the quality of electrical signals in a circuit installed in a flexible cable.

According to one aspect of this disclosure, there is provide an in-vehicle camera which comprises: (a) an imager equipped with a lens; (b) a control board which has mounted thereon a circuit working to control an operation of the imager; (c) a flexible cable which connects between the imager and the control board to achieve communication therebetween; (d) a housing which is made of conductive material and in which the imager, the flexible cable, and the control board are disposed; and (e) a spacer which is designed to have neither electromagnetic wave absorption nor electromagnetic wave reflection properties. The spacer is arranged away from the control board in a contactless manner and located between the flexible cable and an inner surface of the housing to form a gap therebetween.

The spacer is, as described above, disposed between the flexible cable and the inner surface of the housing to ensure the gap therebetween, thereby minimizing a risk that adverse effects of electrical current flowing through a circuit installed in the flexible cable may be exerted on the housing through an electrical field or a magnetic field as compared with in the absence of the gap. This minimizes a flow of electrical current through the housing, thereby alleviating a risk that the housing may function as an antenna to emit noises inside the vehicle.

The spacer is designed not to have the electromagnetic wave absorption property, that is, not to easily consume electrical energy of current flowing therethrough to absorb the electromagnetic wave with high efficiency. This will eliminate a risk that the electrical energy of current flowing through the flexible cable may be transmitted to the spacer through the electrical field or the magnetic field and consumed by the spacer, thereby minimizing undesirable deterioration of electrical signals by the spacer.

The spacer is also designed not to have the electromagnetic wave reflection property, thereby eliminating a risk that electromagnetic noise, as generated by the circuit in the flexible cable, may undergo diffuse reflection between the circuit in the flexible cable and the spacer and, thus, be added to the circuit in the flexible cable. This also alleviates the deterioration of the electrical signal due to the spacer.

As apparent from the above discussion, the structure of the in-vehicle camera is capable of reducing generation of noise transmitted from the housing to inside the vehicle, which avoids the deterioration of electrical signals in the circuit of the flexible cable. The spacer is, as described above, disposed away from the control board in a contactless manner, thereby reducing a risk that when the control board is installed in the housing, the spacer may contact or interfere with the control board.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. Each of the embodiments may be designed to include all possible combinations or modifications of the components in the other embodiments.

Figure 7:
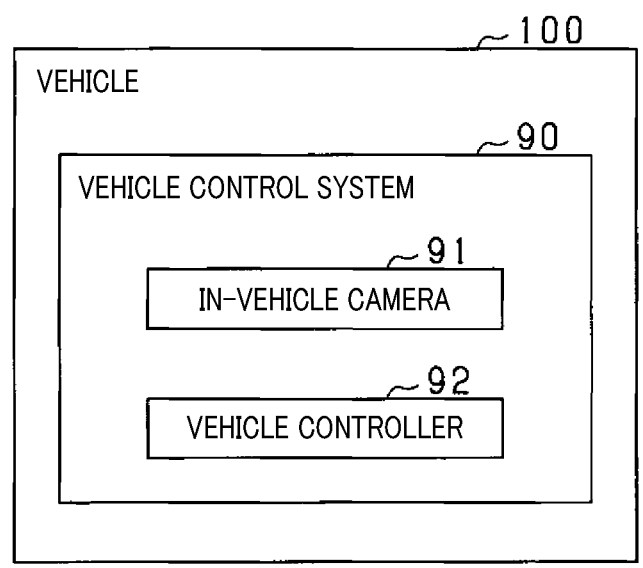
FIG. 7 is a schematic view which illustrates a vehicle and a vehicle control system installed in the vehicle.

Referring to FIG. 7, the vehicle control system 90 includes the in-vehicle camera 91 and the vehicle controller 92 working to analyze an image captured by the in-vehicle camera 91 to control an operation of the vehicle 100.

Figure 3:
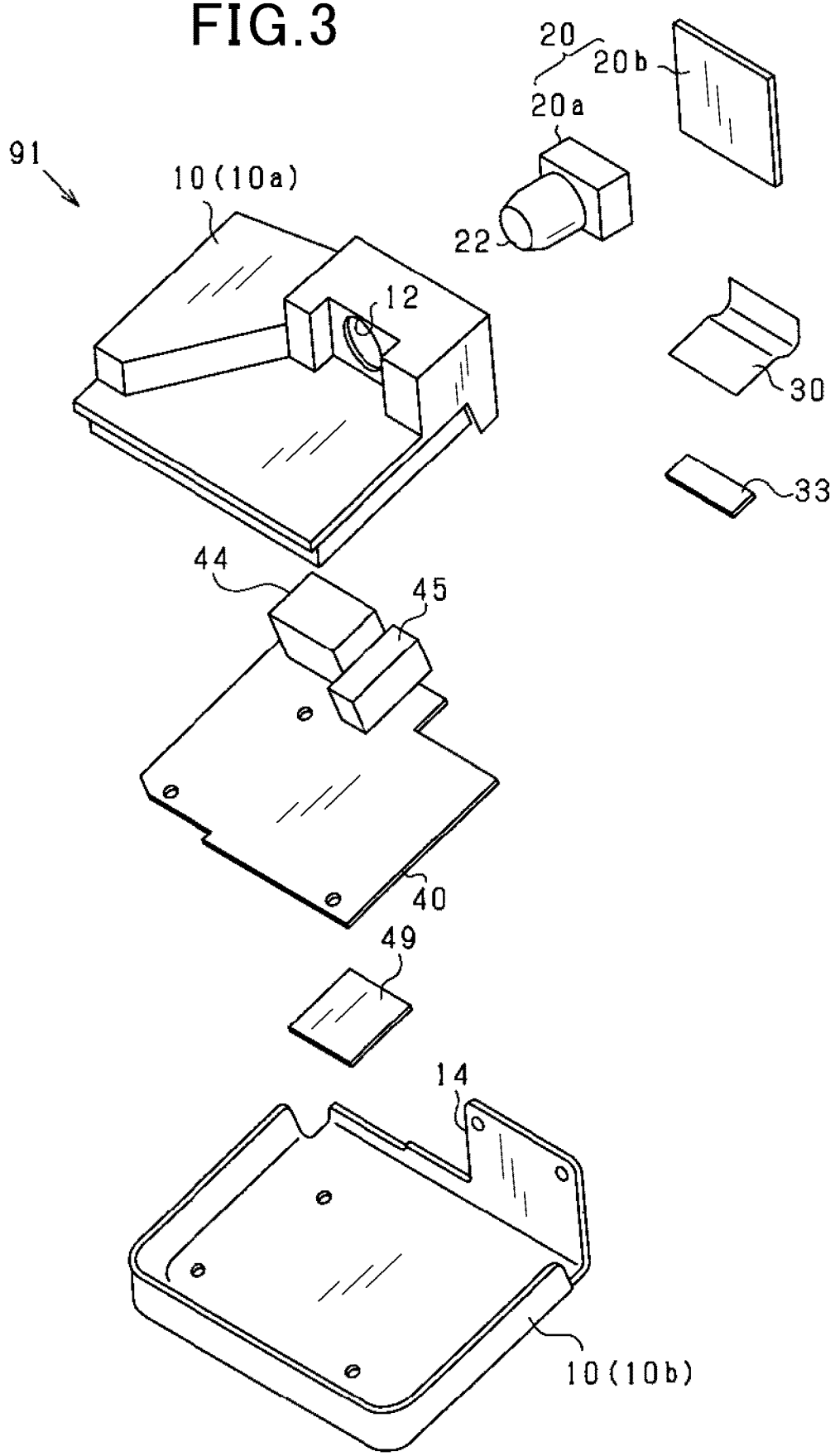
FIG. 3 is an exploded perspective view which illustrates an in-vehicle camera.

The in-vehicle camera 91, as illustrated in FIG. 3, includes the case or housing 10, the imager 20, the flexible cable 30, and the control board 40. The imager 20 is equipped with the lens 22. The control board 40 has mounted thereon a circuit working to control an operation of the imager 20. The flexible cable 30 connects the imager 20 and the control board 40 together to achieve communication therebetween. The housing 10 is made of an electrically conductive material and has the imager 20, the flexible cable 30, and the control board 40 disposed therein.

Figure 6:
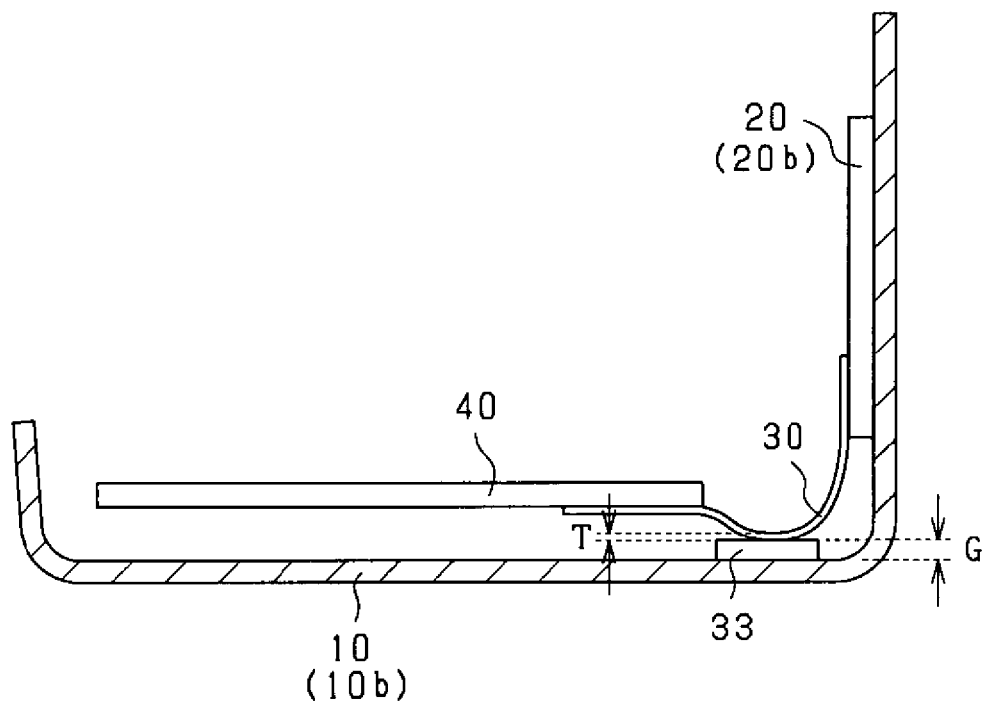
FIG. 6 is a cross sectional side view which illustrates a lower cover of a housing and an inside thereof.

The housing 10, as clearly illustrated in FIG. 6, has the spacer 33 disposed between an inner surface thereof and the flexible cable 30 to form the gap G therebetween. The spacer 33 is arranged away from the control board 40 in a contactless manner. The spacer 33 is designed to have neither electromagnetic wave absorption nor electromagnetic wave reflection properties.

Figure 5:
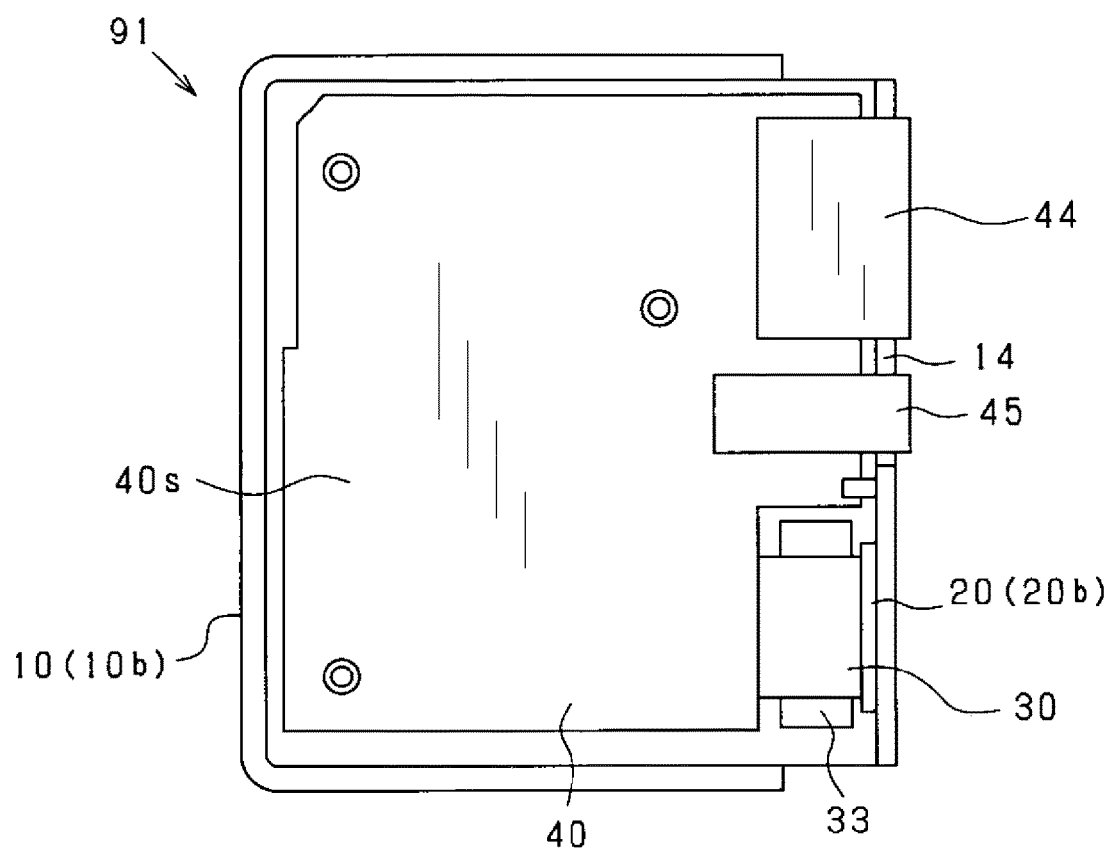
FIG. 5 is a plan view which illustrates a lower cover of a housing and an inside thereof.

Specifically, in the absence of the spacer 33, the flexible cable 30 which is disposed inside the housing 10 will be deflected or bent by its own weight to make physical contact with the inner surface of the housing 10. In the presence of the spacer 33, the flexible cable 30 is bent by its own weight to make physical contact with the spacer 33 without directly contacting the inner surface of the housing 10. In other words, the spacer 33 works to hold the flexible cable 30 from contacting the housing 10. The spacer 33 is made of non-conductive material, such as non-woven cloth or polyurethane and adhered to the inner surface of the housing 10. The spacer 33 is, as can be seen in FIG. 5, located out of alignment with the control board 40 in a planar view perpendicular to the board surface 40s that is a major surface of the control board 40 which has the largest area. In other words, the spacer 33 does not overlap the board surface 40s in a thickness-wise direction of the control board 40.

The structure of the in-vehicle camera 91 will also be described below in detail.

Figure 1:
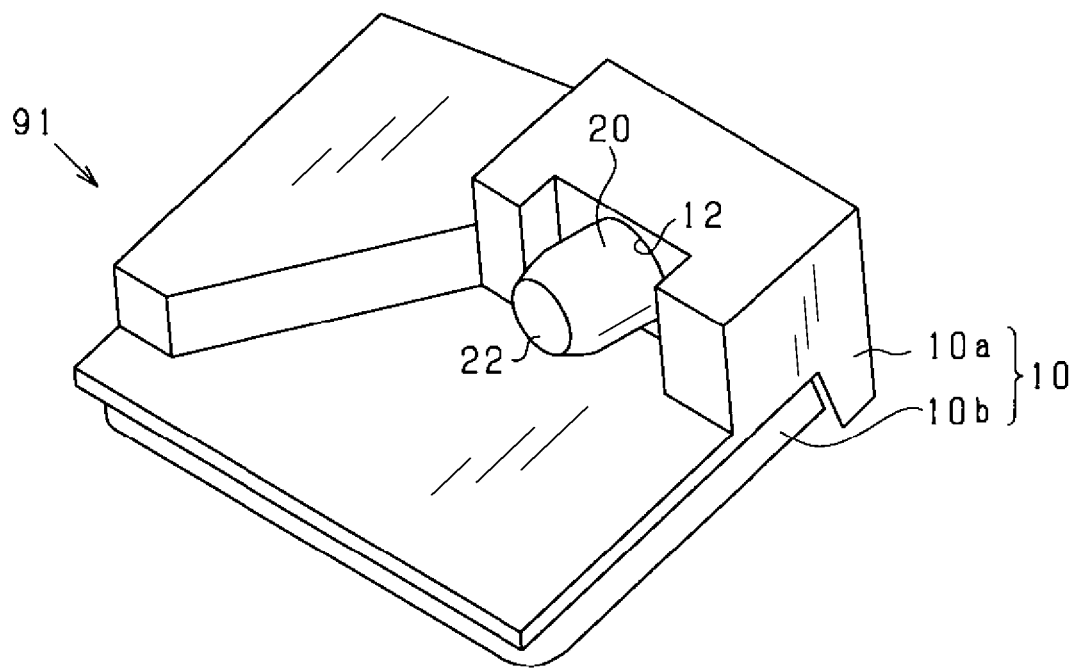
FIG. 1 is a perspective view which illustrates an in-vehicle camera according to the first embodiment.
Figure 2:
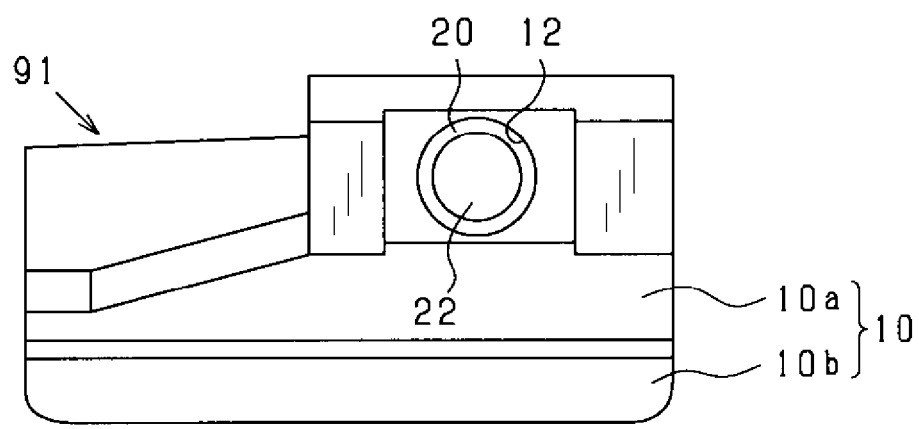
FIG. 2 is a front view which illustrates an in-vehicle camera.

FIG. 1 is a perspective view which illustrates the in-vehicle camera 91. FIG. 2 is a front view of the in-vehicle camera 91. The housing 10 is made up of two covers: the upper cover 10a and the lower cover 10b. The upper cover 10a has the lens hole 12. The imager 20 has the lens 22 protruding outside the housing 10 through the lens hole 12.

FIG. 3 is an exploded perspective view which illustrates the in-vehicle camera 91. The imager 20 includes the imager body 20a equipped with the lens 22 and the image sensor 20b which works to convert light inputted through the lens 22 into an electrical signal. The cushion 49 is interposed between the control board 40 and the lower cover 10b.

Figure 4:
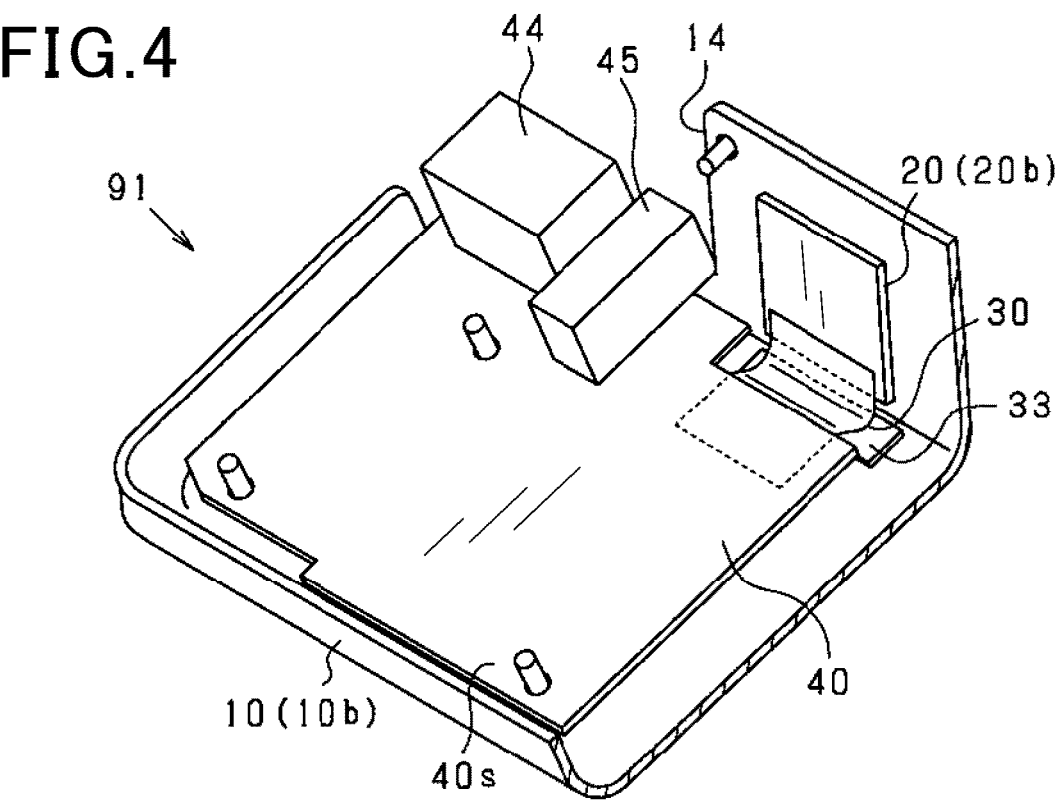
FIG. 4 is a perspective view which illustrates an inside of a lower cover of a housing.

FIG. 4 is a perspective view which shows an inside of the lower cover 10b. The lower cover 10b has a rear surface extending vertically from a bottom surface of the lower cover 10b. The image sensor 20b is secured to the rear surface of the lower cover 10b, so that the image sensor 20b is oriented vertically. The imager body 20a is attached to the image sensor 20b.

The control board 40 is laid above the bottom surface of the lower cover 10b to have the board surface 40s extending horizontally. The flexible cable 30 is elastically bent to extend or protrude from the rear end of the control board 40 upward to the lower end of the image sensor 20b to connect them together. Such bending of the flexible cable 30 will cause the control board 40 to contact the inner bottom surface of the lower cover 10b in the absence of the spacer 33.

The control board 40 has mounted thereon the imager body 20a, electronic devices and a circuit which work to control the operation of the image sensor 20b, electronic devices and a circuit which work to process an image, and a circuit which feeds electric power to the imager 20. The flexible cable 30 is made up of an electrical insulator, such as a soft resinous member, and circuits embedded in the insulator. The circuits of the flexible cable 30 include a circuit working to transmit a command signal from the control board 40 to the imager 20, a circuit working to output an electrical signal produced by the image sensor 20b to the control board 40, and a circuit working to supply electrical power from the control board 40 to the imager 20.

The lower cover 10b has the opening 14 formed in the rear surface thereof. The control board 40 has the vehicle connector 44 and the image connector 45 disposed on a portion of the upper surface thereof which is exposed to the opening 14. The image connector 45 has joined thereto an image transmission line through which data on an image captured by the in-vehicle camera 91 is transmitted to the vehicle controller 92. The vehicle connector 44 has joined thereto a power feeding line through which electrical power is delivered to the in-vehicle camera 91 and communication lines through which the in-vehicle camera 91 communicates with external devices mounted in the vehicle 100.

FIG. 5 is a plan view which illustrates the lower cover 10b and the inside thereof. The spacer 33 is, as can be seen in the plan view, laid not to overlap the control board 40.

FIG. 6 is a cross sectional side view which illustrates the lower cover 10b and the inside thereof. Although dimensions of parts of the in-vehicle camera 91 may be optically selected, the gap G created by the spacer 33 between the flexible cable 30 and the housing 10 in this embodiment is selected to 0.5 mm to 3.0 mm. In terms of the thickness T of the flexible cable 30, the gap G created by the spacer 33 between the flexible cable 30 and the housing 10 is selected to be three or ten times the thickness T of the flexible cable 30.

FIG. 7 is a schematic view which illustrates the vehicle 100 and the vehicle control system 90 installed in the vehicle 100. The vehicle controller 92 analyzes the data on the image received from the in-vehicle camera 91 to control the operation of the vehicle 100. For instance, the vehicle controller 92 performs an automatic braking operation to automatically brake the vehicle 100 or a cruise control operation to automatically follow another vehicle traveling ahead of the vehicle 100.

In the following discussion, beneficial advantages offered by a structure defined in claim 1 will be referred to as first effects. Beneficial advantages offered by a structure in claim 2 will be referred to as second effects. Similarly, beneficial advantages offered by structures defined in claims 3 to 6 will be referred to as third to sixth effects, respectively.

The in-vehicle camera 91 in this embodiment has the first effects as discussed below. The spacer 33 is, as already described with reference to FIG. 6, disposed between the flexible cable 30 and the inner surface of the housing 10 to ensure the gap G therebetween, thereby minimizing a risk that adverse effects of electrical current flowing through the flexible cable 30 may be exerted on the housing 10 through an electrical field or magnetic field as compared with in the absence of the gap G. This minimizes a flow of electrical current through the housing 10, thereby alleviating a risk that the housing 10 may function as an antenna to emit noises inside the vehicle 100.

The spacer 33 is, as described above, designed not to have the electromagnetic wave absorption property, that is, not to easily consume electrical energy of current flowing therethrough to absorb the electromagnetic wave with high efficiency. This will eliminate a risk that the electrical energy of current flowing through the flexible cable 30 may be transmitted to the spacer 33 through an electrical field or magnetic field and consumed by the spacer 33, thereby minimizing undesirable deterioration of electrical signals by the spacer 33.

The spacer 33 is also designed not to have the electromagnetic wave reflection property, thereby eliminating a risk that electromagnetic noise, as generated by the circuit in the flexible cable 30, may undergo diffuse reflection between the circuit in the flexible cable 30 and the spacer 33 and, thus, be added to the circuit in the flexible cable 30. This also alleviates the deterioration of the electrical signal due to the spacer 33.

As apparent from the above discussion, the structure of the in-vehicle camera 91 in this embodiment is capable of reducing generation of noise transmitted from the housing 10 within the vehicle 100, which avoids the deterioration of electrical signals in the circuit of the flexible cable 30. The spacer 33 is, as described above, disposed away from the control board 40 in a contactless manner, thereby reducing a risk that when the control board 40 is installed in the housing 10, the spacer 33 may contact or interfere with the control board 40.

The structure of the in-vehicle camera 91 has the second effects as follows. Specifically, the problem to be solved to produce the first effects, that is, a risk that the housing 10 functions as an antenna to emit noise into the vehicle 100 will become large when the flexible cable 30 is in contact with the housing 10 as compared with when the flexible cable 30 is arranged merely close to the housing 10. The structure of the in-vehicle camera 91 in this embodiment is designed to have the flexible cable 30 which would otherwise be bent by itself into contact with the housing 10 in the absence of the spacer 33, however, to have the spacer 33 which makes physical contact with the flexible cable 30 to avoid physical interference of the flexible cable 30 with the housing 10, thereby enhancing the above first effects.

The structure of the in-vehicle camera 91 additionally has the following third effects. Specifically, the spacer 33 is arranged not to overlap the control board 40 in a planar view of FIG. 5, thereby avoiding a risk that the spacer 33 may physically interfere with the control board 40 and also minimizing disadvantages arising from use of the spacer 33 to reduce production cost of the in-vehicle camera 91.

The structure of the in-vehicle camera 91 also provides the following fourth effects. Specifically, the spacer 33 is, as can be seen in FIG. 4, attached to the inner surface of the housing 10, thereby facilitating the ease with which the spacer 33 is positioned in place.

The structure of the in-vehicle camera 91 also provides the following fifth effects. Specifically, the spacer 33 is made of non-woven cloth or polyurethane and thus does not have the electromagnetic wave absorption and electromagnetic wave reflection properties. This enables the spacer 33 to be produced at low cost.

The structure of the in-vehicle camera 91 also provides the following sixth effects. Specifically, the in-vehicle camera 91 is, illustrated in FIG. 7, used with the vehicle control system 90. The vehicle control system 90, therefore, has the above described first to fifth effects.

Other Embodiments

The above embodiments may be altered in the following ways. For instance, the in-vehicle camera 91 in the first embodiment is, as can be seen in FIG. 7, designed to be used in the vehicle control system 90, but however, may alternatively engineered to be employed with a dashboard camera, also called a car digital video recorder or driving recorder. The in-vehicle camera 91 in the first embodiment sends the image data to the vehicle controller 92 using wires (i.e., the image transmission line), but however, may alternatively be designed to output the image data to the vehicle controller 92 in a wireless manner.

For instance, the spacer 33 shown in FIG. 4 in the first embodiment is made of non-woven cloth or polyurethane, but however, may alternatively be made of another type of non-conductive material. The spacer 33 in the first embodiment is bonded to the inner surface of the housing 10, but however, may alternatively be attached to another part of the in-vehicle camera 91.

What is claimed is:
1. An in-vehicle camera comprising:
an imager equipped with a lens;
a control board comprising a circuit mounted thereon and configured to control operation of the imager;
a flexible cable configured to connect the imager to the control board to achieve communication therebetween;
a housing formed from conductive material and configured to house the imager, the flexible cable, and the control board, the housing comprising an inner bottom surface that extends horizontally and an inner rear surface that extends vertically from the inner bottom surface, the imager being secured to the inner rear surface, the control board being positioned a distance above the inner bottom surface, and the flexible cable being attached to a side of the control board that faces the inner bottom surface; and
a spacer positioned on the inner bottom surface of the housing and arranged away from the control board in a contactless manner, the spacer located between the flexible cable and the inner bottom surface of the housing to maintain a gap therebetween, wherein
the spacer is configured to inhibit electrical energy of current flowing through the flexible cable that is transmitted to the spacer via an electrical field or a magnetic field from being consumed by the spacer.

2. The in-vehicle camera as set forth in claim 1, wherein the flexible cable is configured to be flexed by itself to make physical contact with the housing in absence of the spacer, and arranged in contact with the spacer to be held from contacting the housing.

3. The in-vehicle camera as set forth in claim 1, wherein the control board has a board surface that is a major surface thereof, and the spacer is arranged out of alignment with the control board in a planar view extending perpendicular to the board surface.

4. The in-vehicle camera as set forth in claim 1, wherein the spacer is attached to the inner surface of the housing.

5. The in-vehicle camera as set forth in claim 1, wherein the spacer is made of one of non-woven cloth and polyurethane.

6. A vehicle control system comprising:
an in-vehicle camera set forth in claim 1; and
a vehicle controller which analyzes an image captured by the in-vehicle camera to control an operation of a vehicle.

* * * * *